United States Patent
Hollinshead et al.

[11] Patent Number: 6,164,569
[45] Date of Patent: Dec. 26, 2000

[54] FLEXIBLE SHOWER ARM ASSEMBLY

[75] Inventors: Milton B. Hollinshead; Robert B. Male, both of Fort Collins, Colo.

[73] Assignee: Teledyne Industries, Inc., Fort Collins, Colo.

[21] Appl. No.: 09/241,345

[22] Filed: Feb. 1, 1999

Related U.S. Application Data

[63] Continuation of application No. 08/781,863, Jan. 10, 1997, Pat. No. 5,865,378.

[51] Int. Cl.$^7$ ................................................ B05B 15/08
[52] U.S. Cl. ................................ 239/587.1; 239/587.2; 239/587.3; 239/587.4; 239/587.5; 239/588
[58] Field of Search ............................ 4/615; 239/587.1, 239/587.2, 587.3, 587.4, 587.5, 588, 600; 285/166, 146.1

[56] References Cited

U.S. PATENT DOCUMENTS

| | | | |
|---|---|---|---|
| 1,451,800 | 4/1923 | Agner | 285/146.1 X |
| 1,500,921 | 7/1924 | Bramson et al. | 285/146.2 X |
| 1,695,263 | 12/1928 | Jacques | 285/146.1 X |
| 2,044,445 | 6/1936 | Price et al. | 239/587.4 X |
| 2,196,783 | 4/1940 | Shook | 239/587.4 X |
| 2,680,358 | 6/1954 | Zublin | 285/146.1 X |
| 5,370,427 | 12/1994 | Hoelle et al. | 285/301 |
| 5,521,803 | 5/1996 | Eckert et al. | 362/198 |
| 5,667,146 | 9/1997 | Pimentel et al. | 239/587.1 |

FOREIGN PATENT DOCUMENTS 8902957  6/1991  Netherlands .

Primary Examiner—Andres Kashnikow
Assistant Examiner—Robin O. Evans
Attorney, Agent, or Firm—Holland & Hart LLP

[57] ABSTRACT

A flexible shower arm assembly that allows the user to repeatably adjust the position of the shower head in three dimensions by configuring the shape of the shower arm attached between the water source, such as a shower pipe, and the water dispenser, such as a shower head. The particular position of the shower head, and the direction of the shower spray, can be modified by re-configuring the shape of the shower arm. The flexible shower arm holds the desired position until modified by the user. The flexible shower arm is sealingly attached to the shower pipe by a pipe connector nut, and is sealingly and pivotally attached to the shower head by a connection structure. The flexible shower arm assembly includes an elongated flexible member defining a fluid transfer path, the flexible member having a first end and an opposite second end. The first end of the flexible member is connected in fluid communication with the shower pipe, and the second end of the flexible member is connected in fluid communication to a shower head. A sheath covers the flexible arm from the first end to the second end.

11 Claims, 10 Drawing Sheets

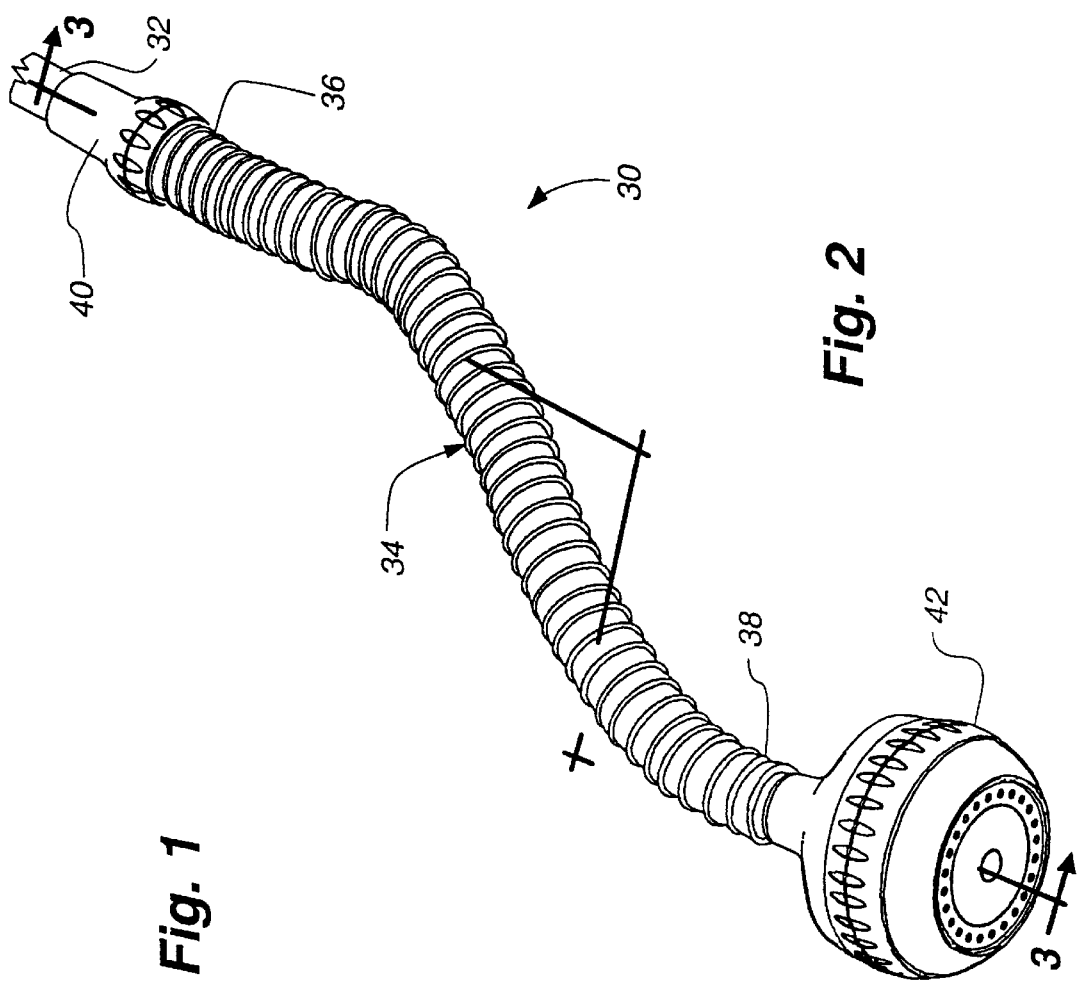
Fig. 1
Fig. 2
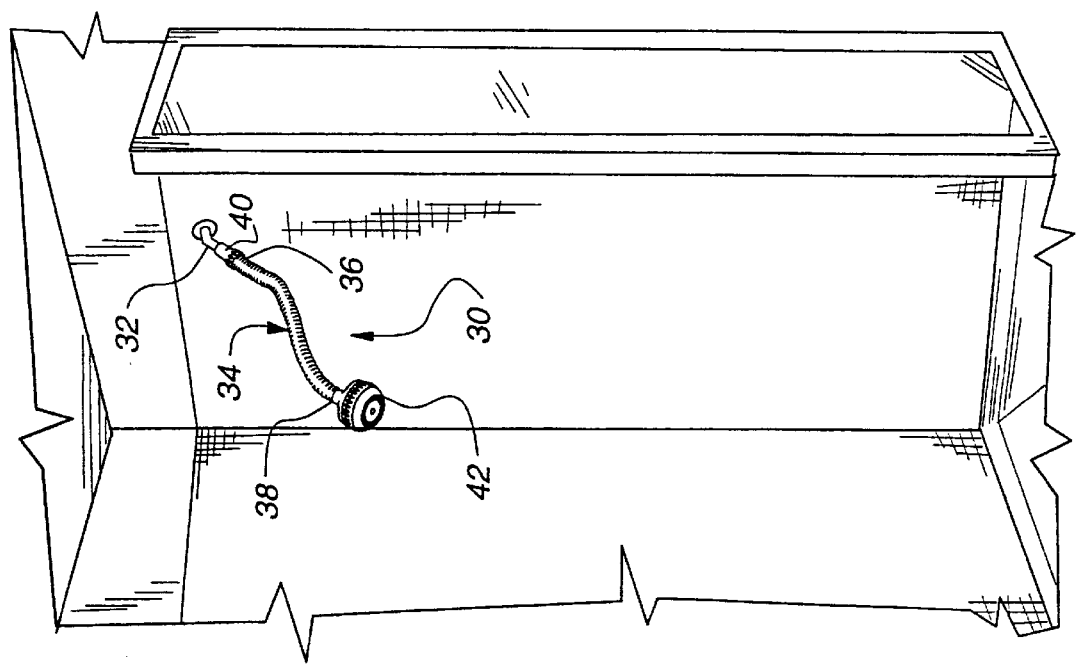

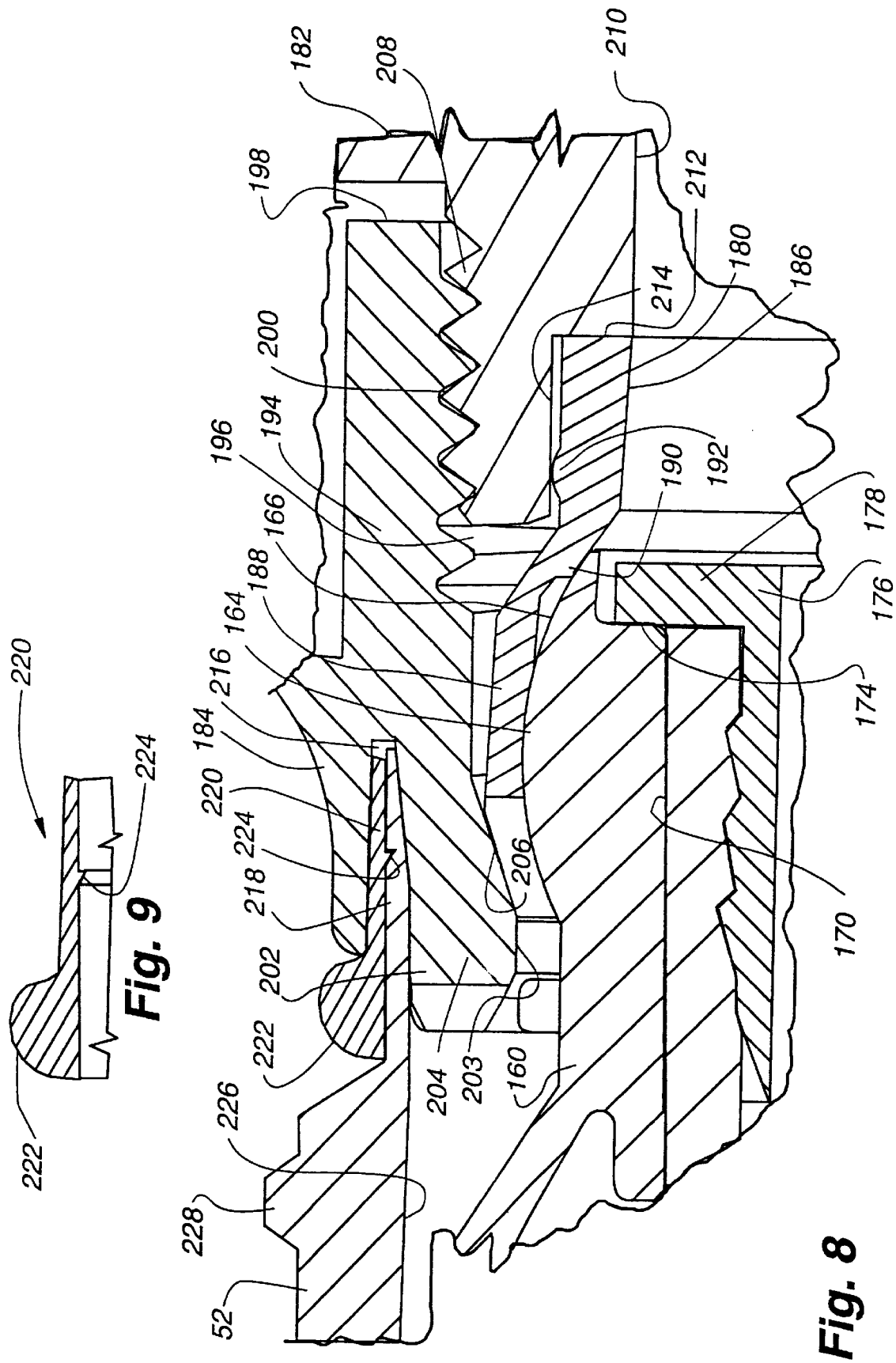

FLEXIBLE SHOWER ARM ASSEMBLY

CLAIM OF PRIORITY

This application is a continuation of U.S. patent application Ser. No. 08/781,863, filed Jan. 10, 1997 and entitled "Flexible Shower Arm Assembly," hereby incorporated by reference herein in its entirety.

FIELD OF INVENTION

This invention relates to a flexible shower arm assembly, and more particularly to a shower arm assembly having a flexible shower arm to allow for flexible adjustment of the position of the shower head.

BACKGROUND

Bathing in a shower has replaced bathing in a bathtub as the preferred method of bathing for several reasons, including convenience, comfort, and energy savings. Typically, a person stands in the shower and is sprayed with water through a shower head, which is attached to a shower pipe extending from the central plumbing. A shower head directly attached to the shower pipe is able to be pivoted about the attachment to the shower pipe to provide a certain degree of movement to control the direction of the shower spray. The movement of the shower head is limited to pivotal movement about the connection point to the shower pipe and cannot be translated in any direction.

An improvement to the adjustability of the standard shower head includes the development of the hand-held shower head. The hand-held shower head includes a flexible hose attached to the shower pipe and a shower head having a handle attached to the opposite end of the flexible hose. The hand-held shower head is typically mounted on a bracket attached to the shower pipe to allow the hand-held shower head to be used as a normal shower head, and can normally be pivoted about the attachment of the bracket to the shower pipe. However, the hand-held shower head can also be removed from the bracket and held in the desired position with one hand. This allows the user to move the shower head to any desired position, however it requires that the user utilize one hand to hold the shower head.

Further development in shower head positioning includes shower pipe extensions, which include one or more rigid links having one end pivotally attached to the shower pipe and the other end pivotally attached to the shower head, or to another rigid link. The links are typically elongated rigid hoses and allow for limited movement in the vertical and lateral directions. The movement is limited by the length of the rigid links and the direction of movement allowed by the pivotal joints between the links. This type of rigid link structure often leaks at the joints and can become loose and fail to hold the desired position.

There is missing in the art a shower head assembly which allows the variable positioning of the shower head in three dimensions while leaving the user with two free hands. It is to overcome the shortcomings in the prior art that the present invention was developed.

SUMMARY OF THE INVENTION

The present invention in general terms concerns a flexible shower arm assembly that allows the user to repeatably adjust the position of the shower head in three dimensions by configuring the shape of the shower arm attached between the water source, such as a shower pipe, and the water dispenser, such as a shower head. The particular position of the shower head, and the direction of the water spray, can be modified simply by re-configuring the shape of the shower arm. The flexible shower arm holds the desired position until modified by the user. The flexible shower arm is sealingly attached to the shower pipe by a pipe connector nut, and is sealingly and pivotally attached to the shower head by a connection structure.

More particularly, the flexible shower arm assembly includes an elongated flexible member defining fluid transfer path, the flexible member having a first end and an opposite second end. The flexible member is repeatably configurable to a fixed shape. The first end of the flexible member is connected in fluid communication with the shower pipe, and the second end of the flexible member is connected in fluid communication to a shower head. A sheath covers the flexible arm from the first end to the second end.

Still more particularly, the flexible shower arm assembly includes a plurality of interconnected beads forming a flexible arm, each bead rotatable with respect to adjacent beads. The plurality of interconnected beads form an axially extending bore, and have a first end bead at a first end of the arm and a second end bead at a second end of the arm. A shower pipe connector nut, defining an internal bore extending therethrough, has a first end for fluid connection to the shower pipe, and a second end for fluid connection to the first end bead. A shower head, defining a connection structure having an internal bore extending therethrough, is in fluid connection to the second end bead at the second end of the arm.

In one embodiment, the first end bead has an externally threaded end and a partially spherical opposing end. The partially spherical end connects to an adjacent bead. The first end of the connector nut is internally threaded, and the second end of the nut is internally threaded for threaded engagement to the shower pipe. The externally threaded end of the first end bead is threadedly received by the internally threaded first end of the nut.

In another embodiment, the connection structure between the shower head and the second end of the flexible arm includes a retainer for rotatably receiving said second end bead, a collar for receiving the second end bead and the retainer, and a connector for positioning the second end bead and the retainer in the collar.

Accordingly, it is an object of the present invention to provide a flexible shower arm that can be repeatably adjusted to a variety of positions to allow control of the direction of spray from a shower head.

Other aspects, features and details of the present invention can be more completely understood by reference to the following detailed description of a preferred embodiment, in conjunction with the drawings, and from the appended claims.

BRIEF DESCRIPTION OF THE DRAWINGS

FIG. 1 is a perspective view of a shower stall having a flexible shower arm assembly incorporating the present invention.

FIG. 2 is an enlarged perspective view of the flexible shower arm assembly incorporating the present invention.

FIG. 8 is an enlarged partial section similar to FIG. 7.

FIG. 9 is an enlarged partial section of the wedge collar similar to FIG. 8.

DETAILED SPECIFICATION

Figure 3:
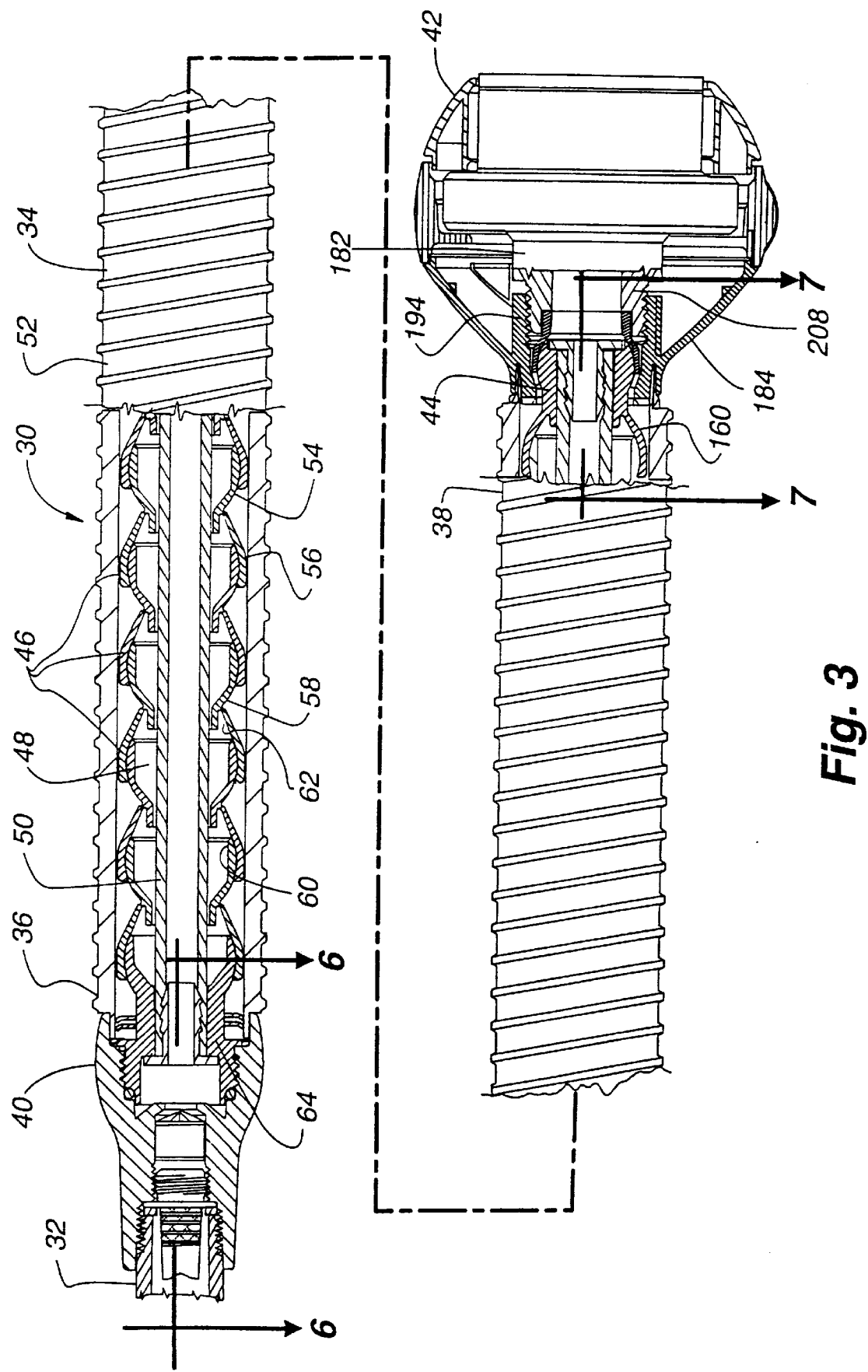
FIG. 3 is a section taken along line 3—3 of FIG. 2.

A shower head assembly 30 encompassing the present invention is shown in FIGS. 1–3. The shower head assembly 30 is attached to a standard shower pipe 32 extending from the wall of a shower stall, as shown in FIG. 1. The shower head assembly 30 includes an elongated flexible shower arm 34 having first 36 and second 38 opposing ends, and defining a water conduit along its entire length. The first end 36 of the flexible shower arm 34 is attached to a shower pipe connector nut 40. The shower pipe connector nut 40 is in turn attached to the standard shower pipe 32 extending from the wall of the shower stall. The second end 38 of the flexible shower arm 34 is adapted to receive a shower head 42. A special connection structure 44 (see FIG. 3) is used between the second end 38 of the flexible shower arm 34 and the shower head 42.

In use, water flows from the shower pipe 32 through the shower pipe connector nut 40, and into the flexible shower arm 34. The water flows through the conduit (a continuous internal cavity) formed along the entire length of the flexible shower arm (described in more detail below) to reach the shower head 42, and then through the shower head. The flexible shower arm 34 can be configured by the user to take in any of a number of positions, which allows the user to position the shower head 42 and the direction of the shower spray as desired, as shown in FIGS. 1 and 2.

Still generally, as shown in FIG. 3, the flexible shower arm 34 is made of a plurality of interlinked ball and socket beads 46 interconnected together, with each of the beads being pivotable with respect to each of the adjacent beads due to the ball and socket structure. Each bead defines an internal cavity 48 extending therethrough, and when interconnected the internal cavity 48 is continuous and extends along the entire length of the flexible shower arm 34. A flexible hose 50 is positioned through the continuous internal cavity 48 for carrying fluid through the flexible arm 34 from the shower pipe nut 40 to the shower head 42. A sheath 52 encompasses the length of the flexible shower arm 34 and extends from the shower pipe connector nut 40 to the base of the shower head 42. The sheath 52 protects the beads 46 from moisture, dirt and other contaminants which may affect the performance of the flexible shower arm 34.

Figure 4:
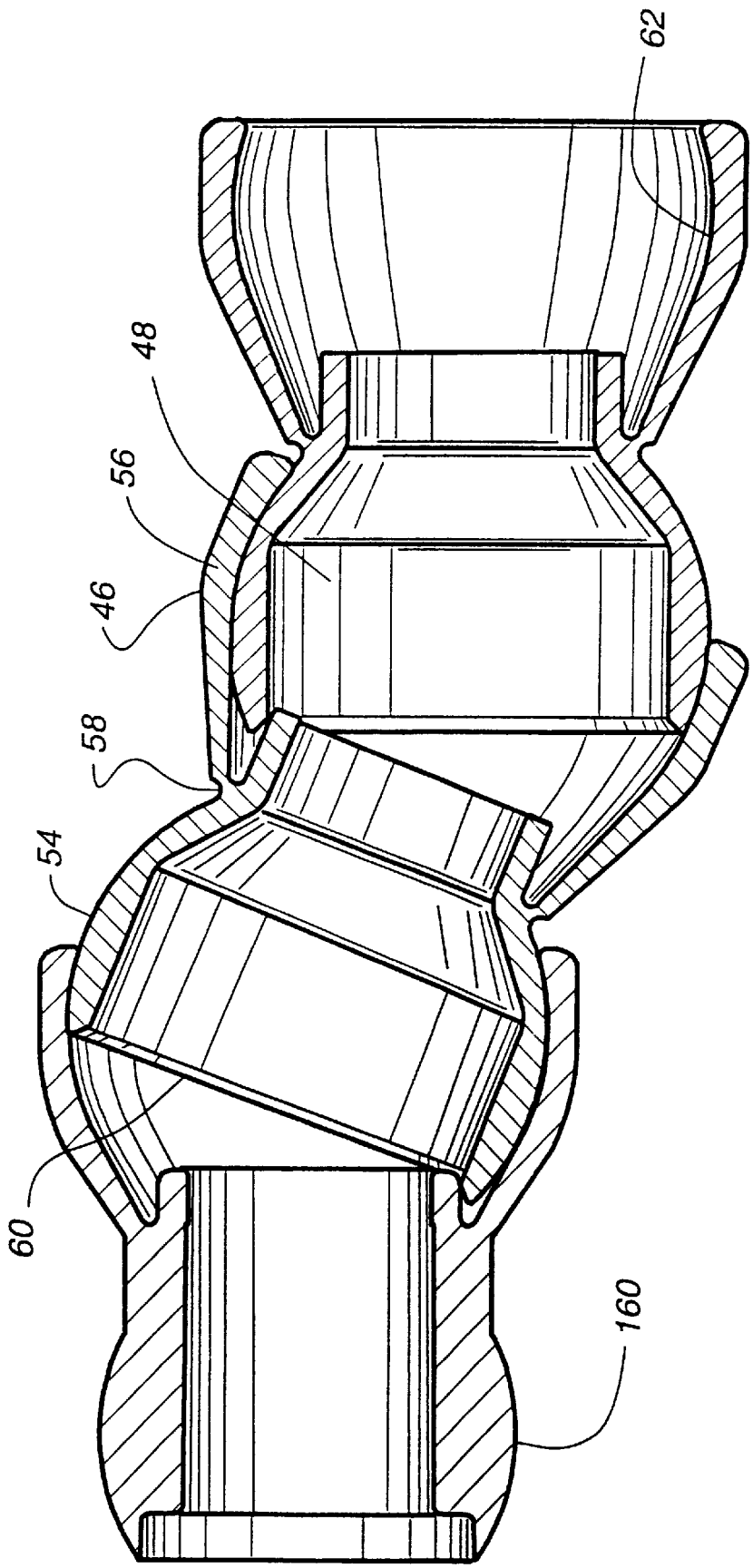
FIG. 4 is an enlarged representative section of interlinked beads, including the second end bead.
Figure 5:
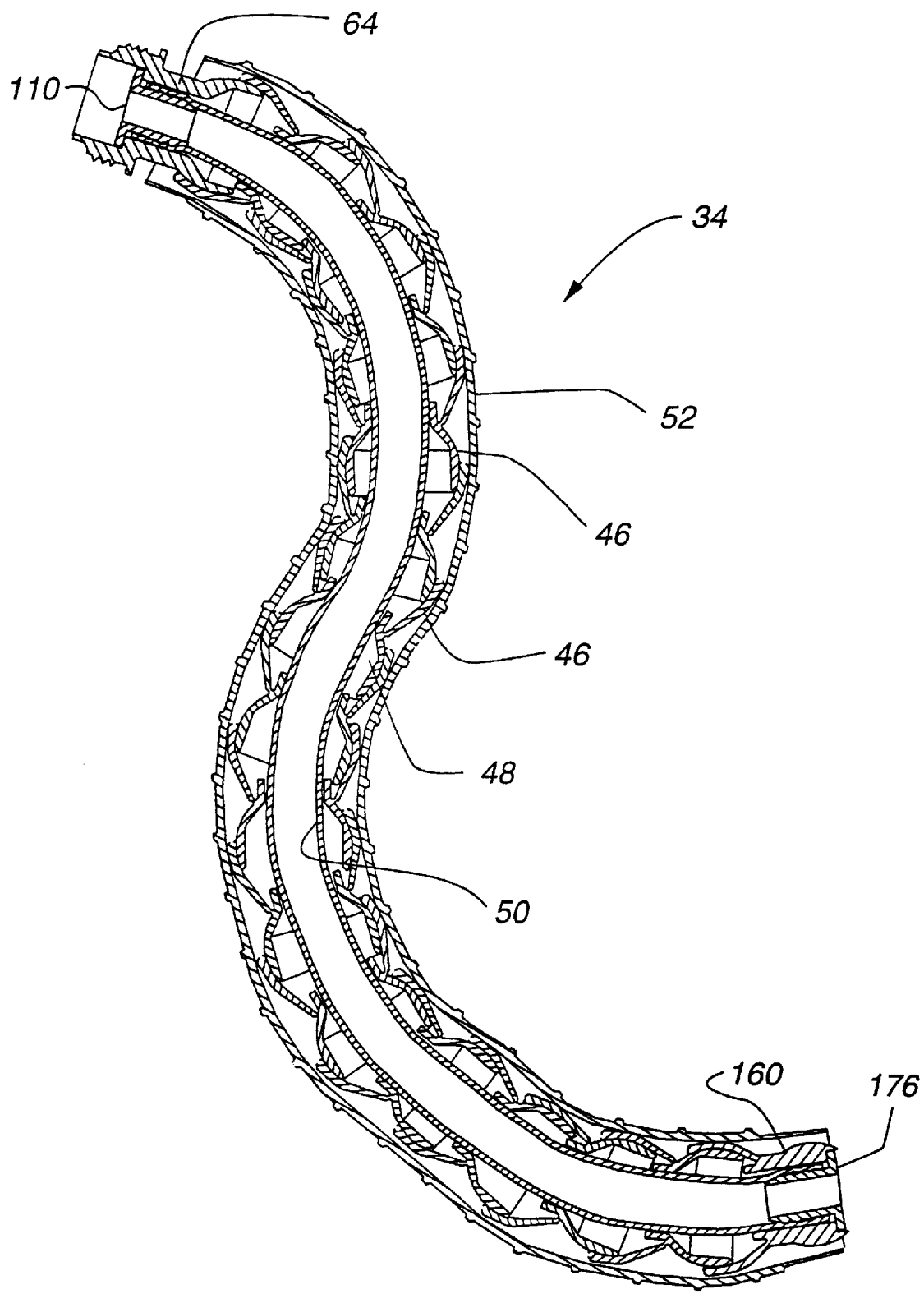
FIG. 5 is a representative section of the flexible shower arm of the present invention.

In more detail, referring to FIGS. 3, 4 and 5, the flexible shower arm 34 is made up a plurality of ball and socket beads 46 which are interconnected for rotational and pivotal movement between adjacent beads. The beads are preferably made of a thermoplastic material, such as Teflon impregnated acetal. Each bead 46 has a smaller end 54 and a larger end 56, with a tapered neck 58 area defined between the two ends. The cavity 48 formed through the bead 46 defines an opening 60 at the smaller end 54 of the bead 46 and an opening at the larger end 56 of the bead. The external surface at the smaller end 54 of the bead 46 is substantially spherical in shape. The internal walls 62 of the cavity 48 formed at the larger end 56 of the bead 46 have a substantially spherical shape for rotatably and pivotally receiving the smaller end 54 of the adjacent bead 46. The beads 46 are interconnected with one another by inserting the smaller end 54 of a first bead into the cavity 48 in the larger end 56 of the adjacent bead 46 and so on, as shown in FIGS. 4 and 5. The engagement of the external walls of the smaller end 54 of one bead with the internal walls 62 of the larger end 56 of an adjacent bead 46 allows the plurality of beads to pivot and rotate with respect to adjacent beads to form a variety of shapes.

The shape of the cavity 48 formed in the large end 56 of the bead 46 is appropriately sized to tightly receive the smaller end 54 of an adjacent bead such that the beads can rotate and pivot with respect to one another under the force of the user, however, the fit is sufficiently tight to create adequate friction to maintain the relative positions of the beads once the flexible shower arm 34 is shaped by the user. A suitable bead 46 for use in constructing the flexible shower arm 34 is disclosed in U.S. Pat. No. 5,449,206, issued to Lockwood Products, Inc. It is contemplated, however, that any structure which allows for repeated flexible movement to a fixed final position, and that can accommodate the desired fluid transfer characteristics could be utilized for this purpose.

Figure 6:
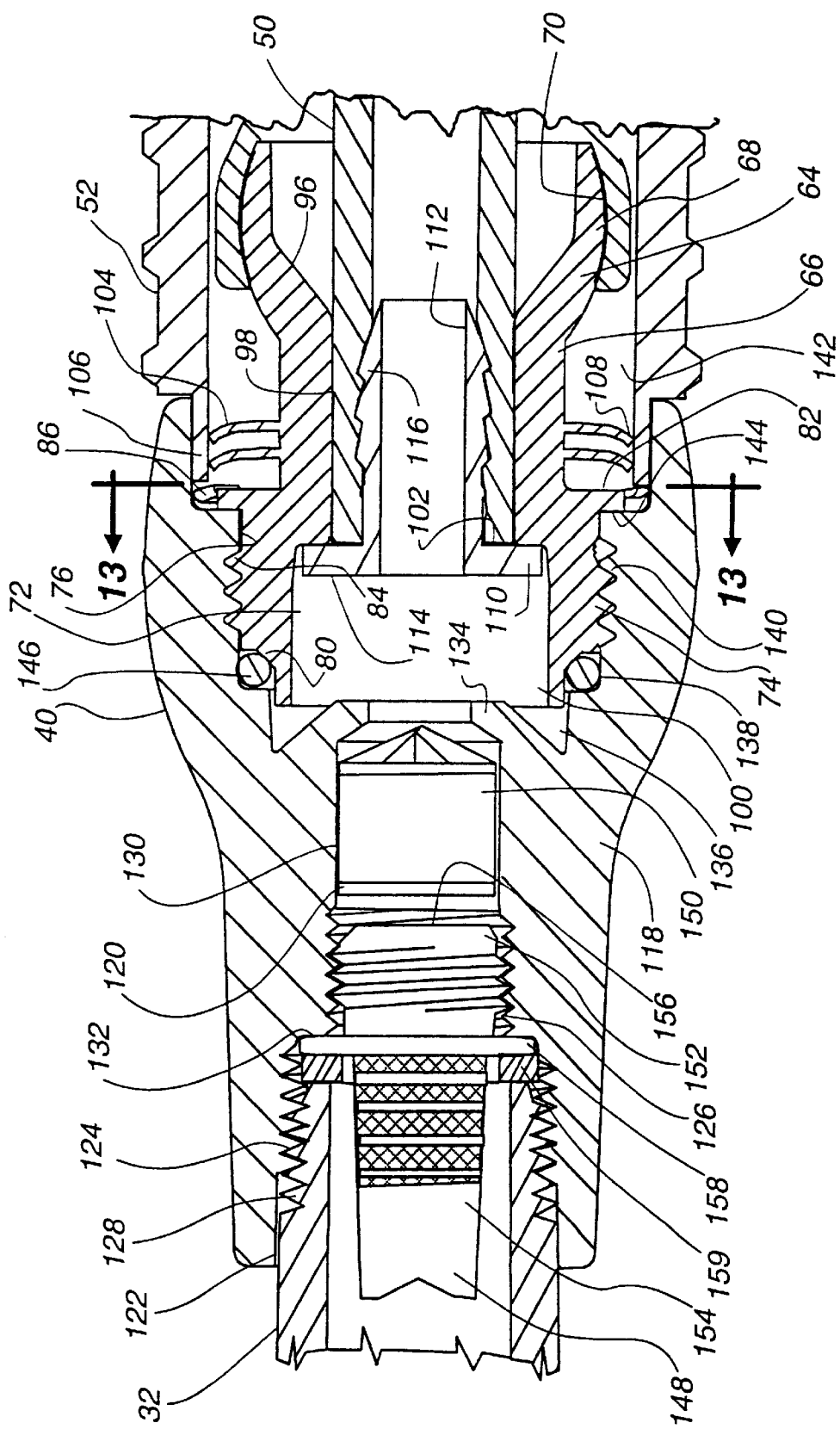
FIG. 6 is a section taken along line 6—6 of FIG. 3.
Figure 10:
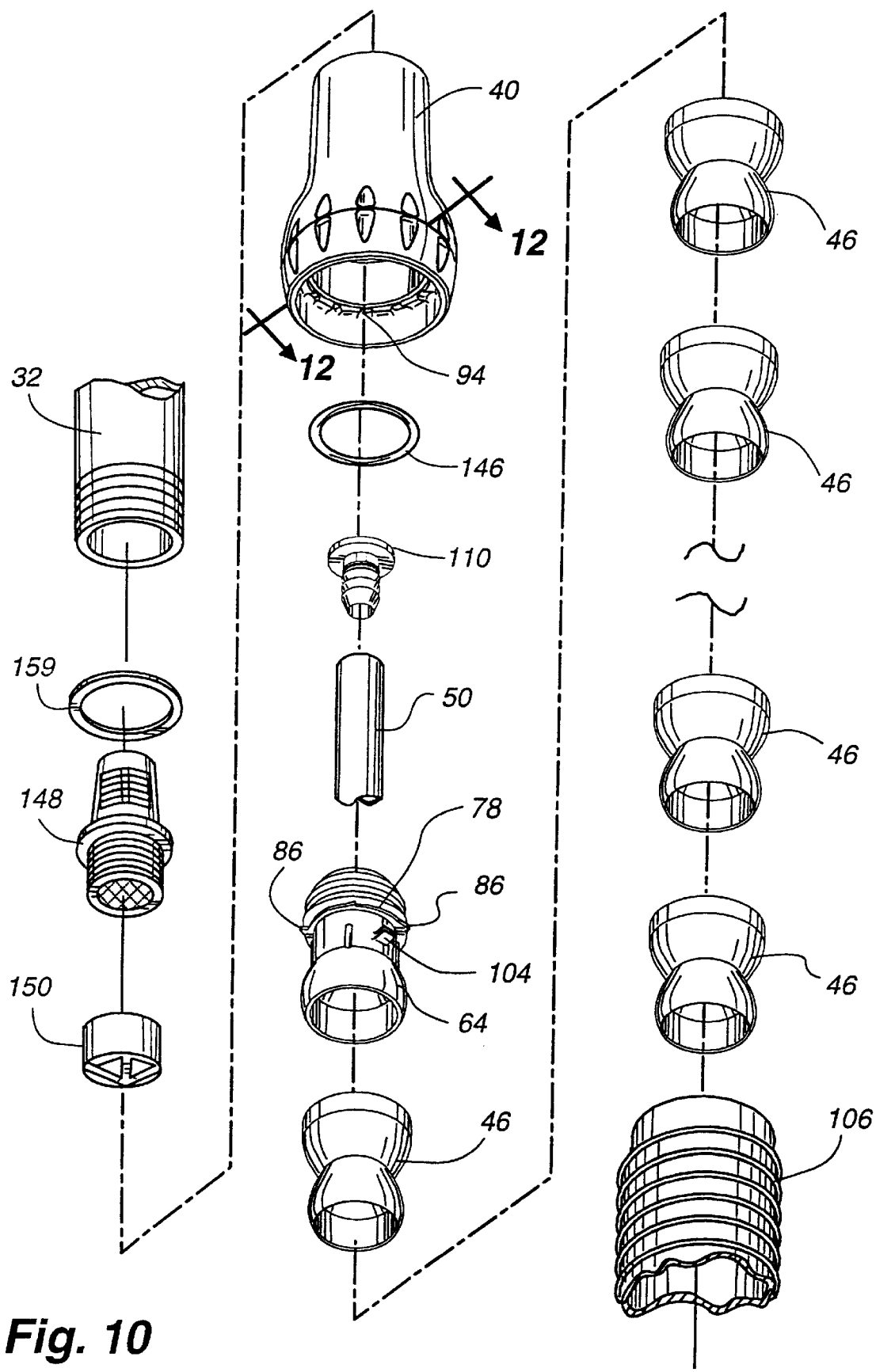
FIG. 10 is a partial exploded view of the first end of the flexible shower arm.

A special first end bead 64 is utilized at the first end 36 of the plurality of beads 46 making up the flexible shower arm 34 to attach the flexible shower arm 34 to the shower pipe connector nut 40, as shown in FIGS. 3, 6, and 10. The first end connection bead 64 defines a main body 66 with one end 68 structured so as to attach to the adjacent bead 46 in the flexible shower arm 34. Preferably, the structure of the end 68 is a partially spherical concave outer surface 70 similar to the smaller end 54 of the typical bead 46 previously described above. A cavity 72 is formed through the first end connector bead 64, and will be described further below. The other end 74 of the first end connector bead 64 has a substantially cylindrical outer surface portion 76 defining a rim 78, an annular sloped sealing surface 80 adjacent to the rim 78, an annular flange 82 or rim extending outwardly from the main body, and external threads 84 positioned between the sealing surface 80 and the flange 82.

Figure 13:
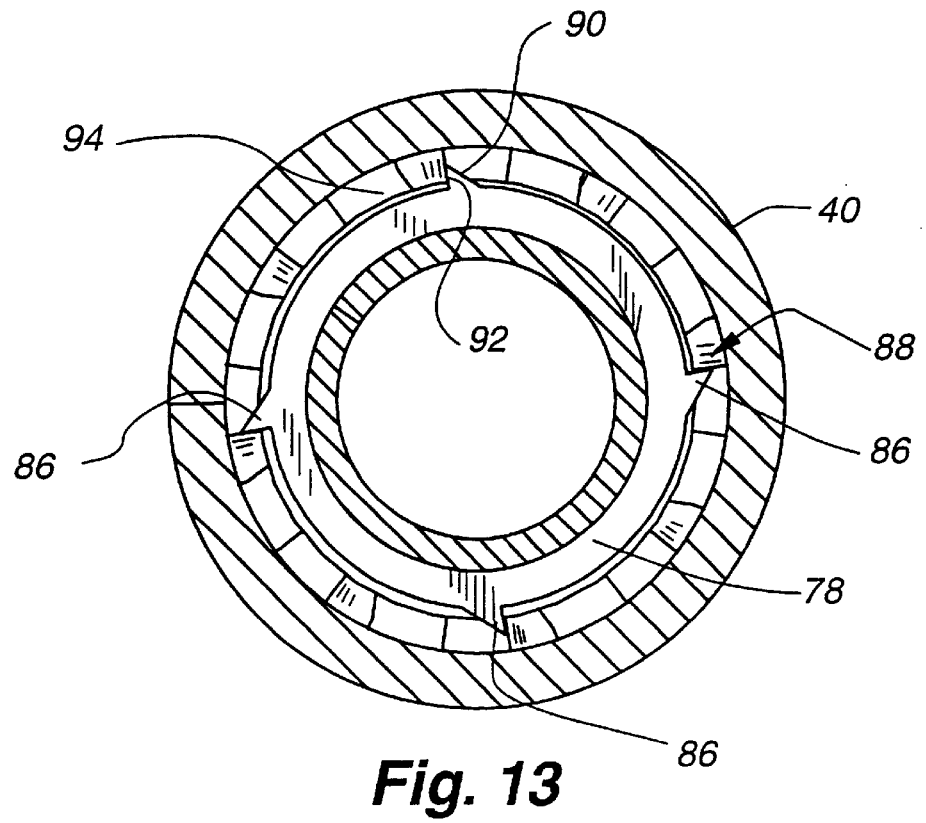
FIG. 13 is a section taken along line 13—13 of FIG. 6.

Protrusions 86 or prongs (see FIGS. 6, 10, and 13) extend radially from the annular rim 78 and form part of a locking mechanism 88 described in more detail below. As shown in FIGS. 10 and 13, prongs 86 extend outwardly from the annular rim 78 on the first end bead 64 and have a longer first side 90 with a shallow slope, and a shorter second side 92 with a steeper slope. The protrusions 86 are oriented on the rim 78 such that when the first end bead 64 is engaged with the shower pipe nut 40, the protrusions engage corresponding ramps 94 formed on the inner surface of the shower pipe nut 40 when the first end bead 64 is completely seated in the shower pipe nut 40 to form a "ratchet" type of locking mechanism 88 which keeps the first end bead 64 from being extracted from the shower pipe nut 40, such as by attempting to unscrew the first end bead 64 from the pipe nut 40.

The cavity 72 formed through the length of the first end bead 64 has a particular shape to facilitate the transfer of fluid therethrough. At the ball end 68 of the first end bead 64, the recess 72 has a relatively large diameter and necks down through a sloped section 96 to a substantially cylindrical throat 98 through the center portion of the first end connector bead 64. The cavity 72 then abruptly widens to a larger diameter, substantially cylindrical, cavity portion 100 formed through to the other end 74 of the connector bead 64.

An engagement surface 102 is formed at the transition from the diameter of the throat 98 to the larger diameter recess 100, and is preferably a surface formed at 90° to the length of the first end connector bead 64. The external surface of the first end connector bead 64, adjacent the throat 98 extending along the middle of its length, defines the minimum exterior dimension of the first end connector bead 64.

A pair of thin, relatively flexible fins 104 extend from opposite sides of the throat 98 portion of the first end connector bead 64. The fins 104 help form a seal with the sheath 52 when the sheath 52 is inserted over the first end connector bead 64 and into the shower pipe nut 40, as described below and shown in FIG. 6. As the end 106 of the sheath 52 is inserted over the first end connector bead 64 and into the shower pipe nut 40, the sheath 52 engages the free ends 108 of the seal fins 104 and bend the seal fins 104 towards the shower pipe nut 40. The space between the tips 108 of the fins 104 and the shower pipe nut 40 is smaller than the thickness of the sheath 52 such that the sheath 52 engages the fins 104 as the sheath is inserted into the shower pipe nut 40. The resiliency of the fins 104 creates a bias force against the sheath 52 to push the sheath 52 against the shower pipe nut 40 and thus create a fastened joint to help block the entry of dirt, particles or other contaminants. In addition, the bent fins also act as a cam surface to create an interference fit to resist the withdrawal of the sheath 52 from the shower pipe nut 40.

The hose 50, preferably made of nylon-reinforced PVC, is inserted through the cavity 48 formed along the length of the flexible arm 34, and is attached to the first end connector bead 64 by a serrated grommet 110, as best shown in FIG. 6. The serrated grommet 110 has a substantially cylindrical main body defining an axial bore 112 formed therethrough, and a radially extending annular flange 114 formed at one end thereof. The outer surface of the main body defines serrations 116, preferably helical, to allow easy insertion of the grommet 110 into the inner diameter of the hose 50, and to resist the extraction of the grommet 110 from the hose 50. The serrations 116 have relatively sharp tips to engage the inner diameter of the hose 50 to grip the hose 50 and resist the extraction of the grommet 110 therefrom.

The hose 50 is first inserted thorough the throat 98 of the first end connector bead 64. The end of the hose 50 is substantially aligned with the end of the throat 98 at the transition between the throat 98 and the larger diameter cavity portion 100. The grommet 110 is then inserted into the bore of the hose 50 such that the undersurface of the annular flange 114 formed on the grommet 110 engages the end of the hose 50 and the engagement surface 102 adjacent the throat 98. The main body of the grommet 110 is sized such that when inserted into the hose 50, the wall of the hose 50 is compressed against the wall of the throat 98 to form a water tight seal, such that water flows only through the hose 50 and not around the hose. The engagement of the annular flange 114 of the grommet 110 against the engagement surface 102 of the first end connector bead 64 also forms a seal to help prevent water from flowing through the bead 64 around the hose 50.

The first end bead 64 of the flexible shower arm 34 is connected to the shower pipe 32 by a shower pipe connector nut 40, as best shown in FIGS. 3, 6 and 10. As shown in FIGS. 3 and 6, the nut 40 has an elongated main body 118 and defines a multi-chambered continuous cavity 120 formed therethrough. The first portion 122 of the cavity 120 has smooth walls. The second portion 124 of the cavity 120 defines internal threads 126 and is of a slightly smaller diameter for receiving the external threads 128 in the shower pipe 32 to allow threaded connections of the nut 40 to the shower pipe 32. The third chamber 130 is partially threaded. An annular seat 132 is formed between the second 124 and third 130 portions of the chamber 120.

An inwardly extending angled annular flange 134 is formed at one end of the third portion 130 of the cavity 120 and reduces the diameter of the cavity 120 significantly to control water flow in conjunction with the water flow restrictor 150. An annular recess 136 is formed about the base of the angled annular flange 134 for receiving the rim of the first end bead 64 upon insertion, as described further below. An annular seal seat 138 is next formed in the cavity 120 beyond which an internally threaded region 140 is defined and terminates in the final chamber 142 having a larger diameter and defining an annular seating surface 144 oriented at 90° to the length of the pipe nut 40. A plurality of ramps 94 are spaced circumferentially on the interior wall of the final chamber 142, adjacent to the seating surface 144. These ramps 94 work in conjunction with the protrusions 86 formed on the annular flange 82 of the first end bead 64 to form the thread-locking mechanism 88.

Figure 12:
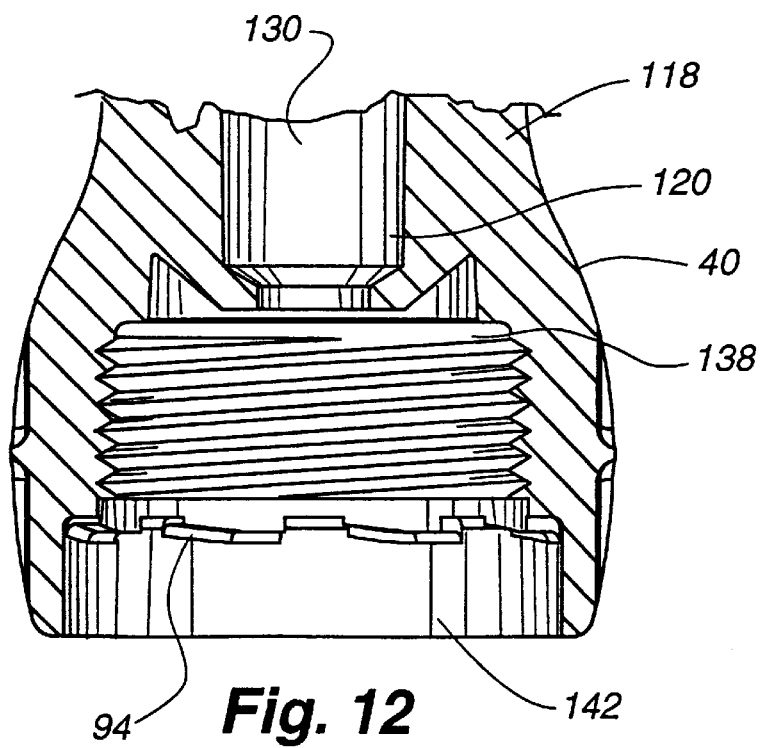
FIG. 12 is a representative section of the pipe nut utilized in the present invention.

The end 74 of the first end bead 64 is threadedly received in the pipe nut 40 until the sealing surface 80 on the first end bead 64 engages an O-ring seal 146 and compresses it against the annular seal seat 138 formed in the pipe nut 40. The radially extending external flange 82 of the first end bead 64 simultaneously engages the flattened engagement surface 144 formed in the pipe nut 40 to solidly position the first end bead 64 to the pipe nut 40. The plurality of ramps 94 formed on the interior surface of the pipe nut 40 adjacent to the flattened engagement surface 144 engage the protrusions 86 formed on the radial extending external flange 82 of the first end nut 64 and allow the first end nut 64 to be threaded into the pipe nut 40 with a right-handed thread motion. The shape of the protrusions 86 on the external flange 82 on the first end bead 64 resist the counter-clockwise relative rotation of the first end bead 64 with respect to the pipe nut 40 to keep the first end bead 64 from accidentally being unscrewed from the pipe nut 40. The interlocking protrusions 86 and ramps 94, as shown in FIGS. 12 and 13, form a locking mechanism 88 which basically allow the first end bead 64 to be threadedly received by the pipe nut 40 and resist the threaded extraction from the pipe nut 40 of the first end bead 64.

The O-ring 146 forms a seal between the first end bead 64 and the pipe nut 40 to keep water from flowing around the first end bead 64 and to only flow through the hose 50 extending through the flexible arm 34. An end 106 of the sheath 52 is positioned outside of the first end bead 64, engaging the seal fins 104, and inside of the end of the pipe nut 40 to assist in fixing the end 106 of the sheath 52 to the pipe nut 40 and form a seal to keep water and dirt as well as other contaminants from reaching the interconnected beads 46.

A water filter member 148 and a flow restrictor 150 as shown in FIG. 6, are positioned in the pipe nut 40. The filter 148 has a first portion 152 having external threading and a second portion 154 having filtering structure, such as screen or small perforations. Water flows through the filtering structure and into a cavity 156 formed in the filter 148, and out the end of the first portion 152. An annular seating flange 158 is formed between the two portions 152, 154 and extends outwardly therefrom. The first portion 152 of the filter 148 is threadedly received by the threads in the third chamber 130 until the flange 158 engages the annular seat 132 when the filter 148 is in the proper position, also being engaged by the end of the shower pipe 32, with an flat washer 159 positioned therebetween to form a seal. The flow restrictor 150 is held in the third portion 130 of the cavity 120 by the filter 148, and receives the water after it has passed through the filter 148.

Figure 7:
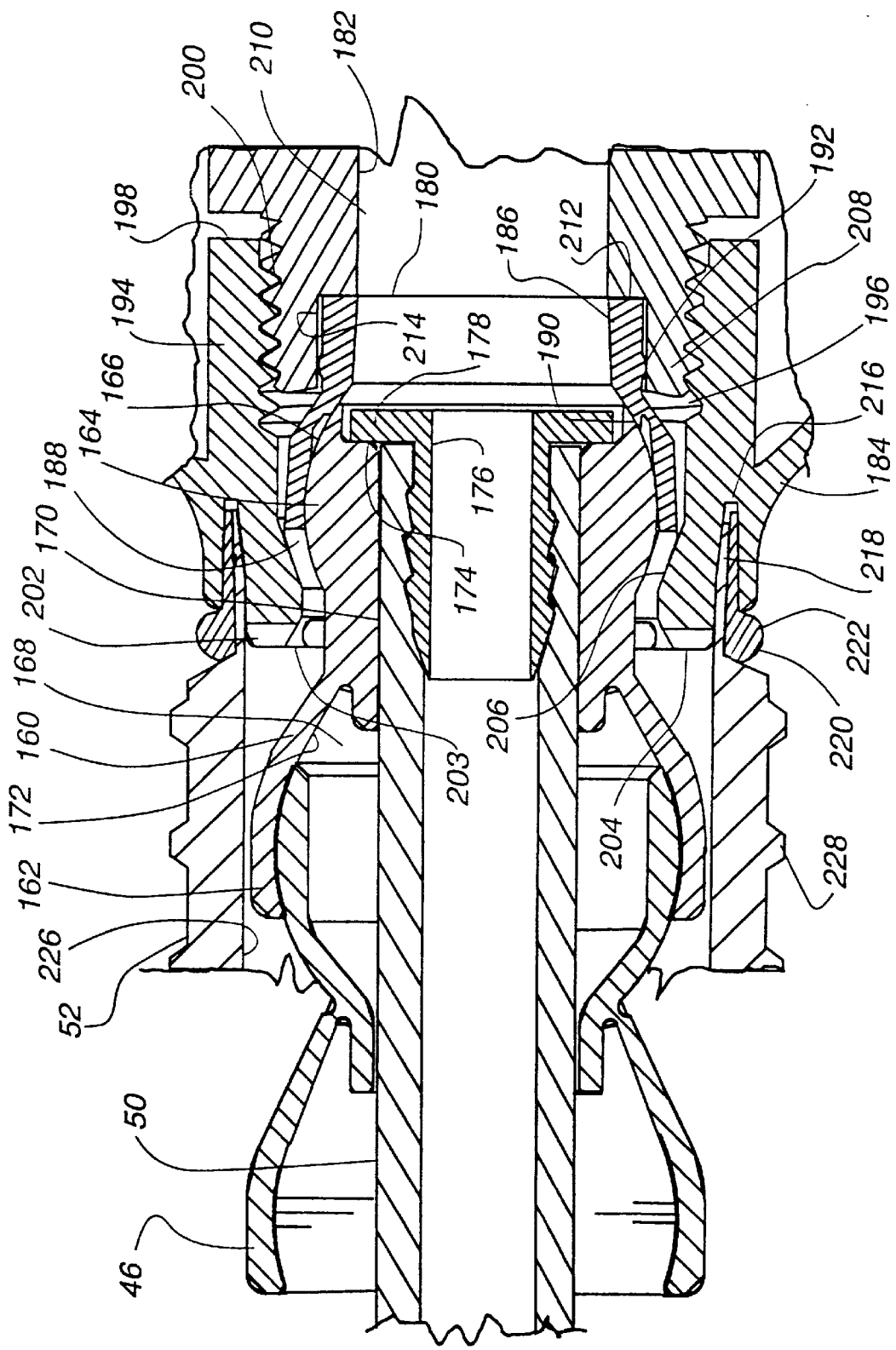
FIG. 7 is a section taken along line 7—7 of FIG. 3.
Figure 11:
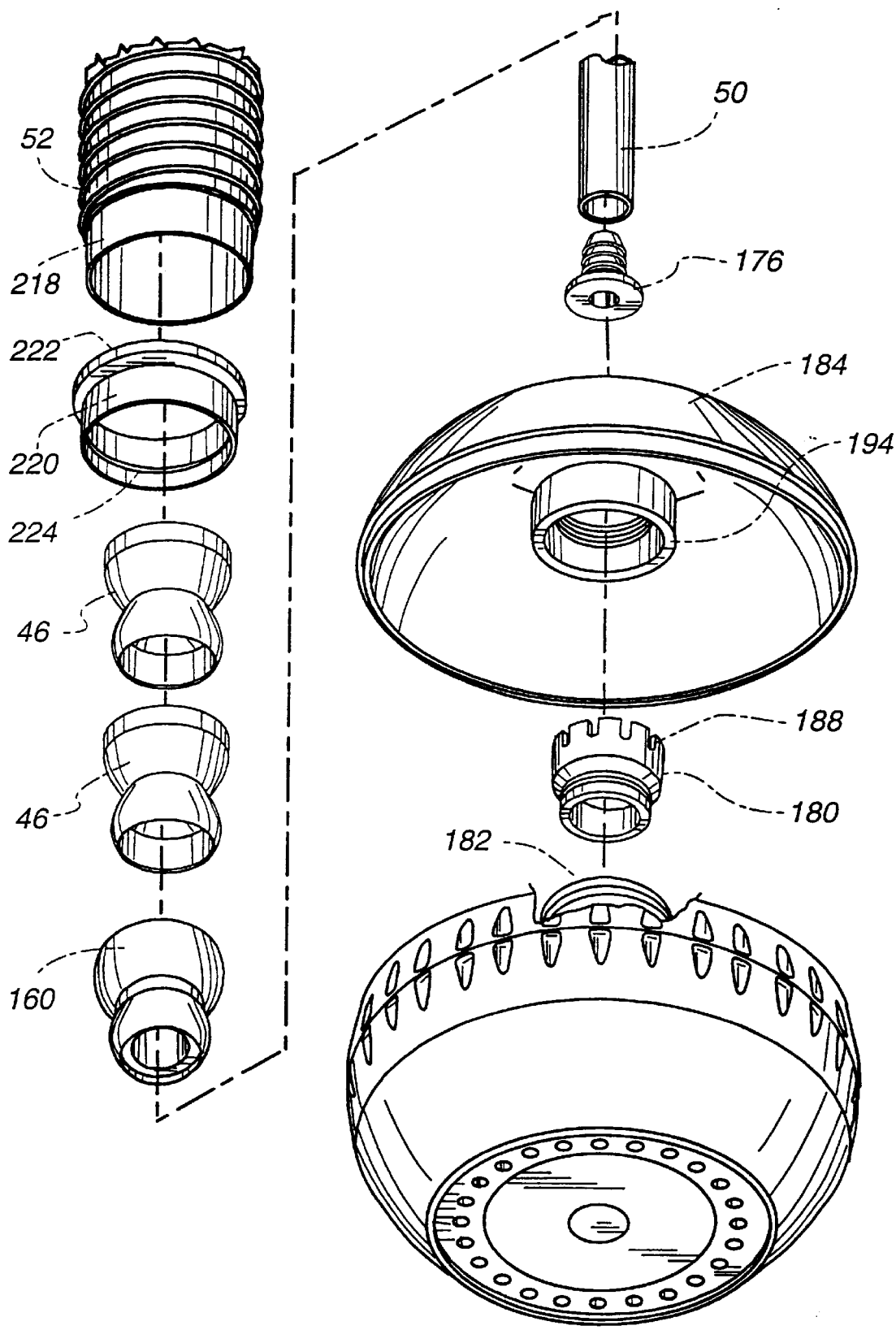
FIG. 11 is a partial exploded view of the second end of the flexible shower arm.

A specially designed second end bead 160 is positioned at the shower head end of the flexible arm 34 to facilitate the connection of the shower head 42 to the flexible arm 34, as shown in FIGS. 7, 8 and 11. One end of the second end bead 160 has a shape structured to attach to the adjacent bead 46 in the flexible shower arm 34. Preferably, this shape is identical to the larger end 56 of the typical bead 46 used in forming the interlocking bead structure of the flexible arm 34, and is the receiving, or female, end 162 of the second end bead 160. The opposite 164, or male end, of the second end bead 160 has a substantially spherical outer surface 166. The cavity 168 formed through the entire second end bead 160 has a central throat portion 170 converting to a partially spherical portion 172 in the receiving end 162 of the second end bead 160 (for receiving the smaller end 54 of the typical bead 46 as defined above) and a portion adjacent 160 the male end 164 of the second end bead 160 having a diameter larger than the throat 170, to form an engagement surface 174 for the grommet which is used in attaching the hose 50 to the second end bead 160. A grommet 176 such as that described above with respect to the first end bead 64 is utilized to fix the end of the hose 50 to the second end bead 160 in an identical manner to that described with the first end bead 64. A seal is thus formed between the hose 50 and side walls of the throat 170 by the insertion of the grommet 176 into the hose 50 when the hose 50 is positioned in the throat 170. The outwardly extending flange 178 of the grommet 176 engages the engagement surface 174 formed by the transition of the throat 170 to the larger diameter portion of the cavity 168.

A finger collar, or retainer, 180 is used in conjunction with the internal shower head body 182 to attach the small end 164 of the second end bead 160 to the base cone 184 of the shower head 42. The finger collar 180 has a substantially cylindrical main body 186 with fingers 188 extending longitudinally from around the main body 186, and an annular seal rim 190 formed on the interior wall of the main body 186 of the finger collar 180. The seal rim 190 is positioned adjacent to but below the base of the finger extensions 188 from the main body 186 of the finger collar 180. An interference seal 192 is formed around the outer surface of the main body 186 of the finger collar 180 and is a rounded protrusion extending circumferentially around the main body 186.

The base cone 184 of the shower head 42 has a collar 194 defining a passageway 196 formed therethrough with one end 198 internal to the shower head 42 having internal threading 200 and the other end 202 external to the shower head 42 having an opening 203 reduced in size by an inwardly sloped, partially conical rim 204 defining an interior finger engagement surface 206 which is further described below.

The internal shower head body 182 defines an externally threaded connector end 208 and an axial recess 210 formed adjacent the threaded end of the connector 208. The axial recess 210 has a base wall 212 and smooth side walls 214.

In connecting the second end bead 160 to the base cone 184 of the shower head 42, the male end 164 of the second end bead 160 is inserted through the reduced-size external opening 203 in the base cone 184. The finger collar 180 is then positioned over the male end 164 of the second end bead 160 such that the fingers 188 extend along substantially the entire length of the male end 164 of the second end bead 160, and the seal rim 190 on the internal wall of the finger collar 180 continuously engages the outer surface 166 of the male end 164 of the second end bead 160. The externally threaded connector 208 of the internal shower head body 182 is then threadedly received in the internally threaded end 200 of the collar 194 of the base cone 184. The external annular protrusion 192 on the main body 186 of the finger collar 180 engages the smooth sidewall 214 of the axial cavity 210 formed in the end of the connector 208 on the internal shower head body 182 to form a watertight seal between the finger collar 180 and the internal shower head body 182. The end of the finger collar 180 engages the base wall 212 of the cavity 210 in the shower head body 182, and as the connector 208 is threaded into the base cone 184, the base wall 212 of the cavity 210 pushes the finger collar 180 towards the reduced-size aperture 203 in the collar 194. The finger engagement surface 206 of the necked-down portion 204 of the external aperture 203 forces the finger extensions 188 on the finger collar 180 to wrap around the partially spherical outer surface 166 of the male end 164 of the second end bead 160 to rotatably grip the male end 164 of the second end bead 160 and keep the second end bead 160 from being extracted from the base cone 184. In addition, the seal rim 190 forms a watertight seal between the finger collar 180 and the second end bead 160. The thickness of the finger extensions 188 is sufficient to retain the male end 164 of the second end bead 160 in the base cone 184.

The internal annular seal rim 190 is also forced against the external surface 166 of the male end 164 of the second end bead 160 to form a watertight seal between the second end bead 160 and the finger collar 180.

The necked-down engagement surfaces 206 are partially conically shaped to functionally wrap the finger extensions 188 of the finger collar 180 around the partially spherical surface 166 of the male end 164 of the second end bead 160, which creates a frictional gripping force on the male end 164 of the second end bead 160 as well as an interference fit to keep the male end 164 of the second end bead 160 from being extracted from the base cone 184. The base cone 184 can thus rotate about the male end 164 of the second end bead 160 while maintaining the seal between the second end bead 160 and the finger collar 180 because the seal rim 190 maintains contact with the external surface 166 of the male end 164 of the second end bead 160 as the shower head 42 is rotated about the male end 164. Functionally, the rotation of the shower head 42 is more than likely to reside in the rotation of the second end bead 160 with the next adjacent bead 46, however some pivoting is allowed between the shower head 42 and the second end bead 160. A continuous fluid flow path is thus formed through the second end bead 160, through the finger collar 180, and into the internal shower head body 182 for dispensing through the shower head 42, with adequate seals to keep the water from leaking out from around each of the interconnected parts.

The shower head base cone 184 defines an annular recess 216 extending circumferentially around, but spaced away from the collar 194. The annular recess 216 receives the end 218 of the sheath 52 to give the final product a finished look and to seal the end 218 of the sheath 52 to the base cone 184 to prevent passage of water, dirt and other contaminants to the interconnected beads. A wedge collar 220 is used to assist in retaining the sheath end 218 in the recess 216, and to improve the seal characteristics, as shown in FIG. 8. The wedge collar 220 is substantially cylindrical in shape, has thin sidewalls, and defines a wedge ring 222 on the exterior surface at a first end thereof. A sharp annular rim 224, FIG.

9, is formed on the interior surface of the wedge collar 220 adjacent the second end.

In using the wedge collar 220 as an anchor, the wedge collar 220 is first placed over the end 218 of the sheath 52 such that the second end of the wedge collar 220 is substantially aligned with the end 218 of the sheath 52. It is important that the sharp rim 224 engages the sheath 52. The wedge collar 220 and sheath 52 are then pushed into the annular recess 216, which is dimensioned to tightly receive the wedge collar 220 and sheath 52, thus pressing the sharp rim 224 into the sheath 52 securely fixing them together. The wedge collar 220 and sheath 52 are inserted into the recess 216 until the wedge ring 222 engages the end of the base cone 184, and resiliently biases the portion of the base cone 184 outwardly to develop an even tighter engagement of the sheath 52 and wedge collar 220 to the base cone 184, forming an adequate seal.

Alternatively, a U-shaped spring clip can be attached over the end 218 of the sheath 52 to assist in retaining the end in the recess 216. The clip has barbs extending inwardly and outwardly. The inwardly extending clips grip the sheath, while the outwardly extending clips engage the walls of the recess 216. The barbs are directional to inhibit the extraction of the end 218 from the recess 216. Typically, two or three clips are positioned on the end of the sheath to provide an adequate retaining force.

The sheath 52 surrounding the entire length of the flexible arm 34, as shown in FIGS. 1, 2 and 5, is substantially cylindrical in shape and defines an internal cavity 226 along the entire length of the sheath 52. Helical ribs 228 are formed on the outer surface of the sheath 52 to provide structural support to the sheath 52 and also to assist the sheath 52 in bending smoothly in conjunction with the movement of the flexible arm 34. The end 106 of the sheath 52 adjacent to the first end bead 64 is inserted into the shower pipe nut 40 to form a fastened joint. The end 218 of the sheath 52 adjacent to the shower head 42 is inserted into the shower head base 184 also to form a fastened joint. With the sheath 52 being attached at either end, it is difficult for water, moisture, dirt or other contaminants to reach the interlocking beads 46. It has been found that water, moisture, dirt or other contaminants cause the interlocking beads to degrade in performance by causing the interlocking beads to become noisy or move less smoothly with respect to one another. The outer sheath 52 is also easier to clean than the individual beads 46, and is thus more convenient. The sheath 52 is preferably made of chemically resistant thermoplastic material, such as polyethylene. The ribs 228 formed on the outer surface of the sheath 52 to create a corrugated outer surface. The bead is in a helix pattern, and provides structural strength to the sheath. The webbing between the beads compresses (folds), or extends, depending on the way the flexible arm is bent.

In operation, the shower pipe connector nut 40 is threadedly received in the shower pipe 32 to form a seal and cause the water to flow through the flexible shower arm 34 to the shower head 42. The water flows through the shower pipe connector nut 40, through the first end bead 64 attached to the shower pipe connector nut 40 and into the hose 50 which is positioned through the center of the interlocking beads 46. The water exits the hose and passes through the second end bead 160 adjacent to the shower head 42, and finally through the shower head 42 to be dispensed to the user.

The first end bead 64 attached to the shower pipe connector nut 40 provides for a watertight seal between the first end bead 64 and the connector nut 40, and a watertight seal between the hose 50 and the first end bead 64 so that the water exiting the shower pipe 32 flows only through the hose 50 to the shower head 42, and thus eliminates leaking. The second end bead 160 is connected to the shower head 42 to allow the shower head 42 to pivot on the second end bead 160 as well as maintain the watertight seal between the second end bead 160 and the shower head 42.

To position the shower head 42 in the desired location, the user simply grasps the shower head 42 and moves it to bend the flexible arm to the desired configuration to position the shower head 42 in one of many positions, including laterally, vertically, forward or backward, or virtually any combination thereof. Once positioned, the flexible shower arm 34 maintains its shape until modified by the user. The length of the flexible shower arm 34 is limited only by the weight of the shower head 42, the structural strength of the connection to the shower pipe 32, and the tightness with which the beads 46 fit together to form the flexible shower arm.

Presently preferred embodiments of the present invention have been described with a degree of particularity. This description has been made by way of preferred example. It should be understood, however, that the scope of the present invention is defined by the following claims, not necessarily by the detailed description of the preferred embodiment.

We claim:

1. A flexible shower arm assembly for connection to a shower pipe at one end, the assembly comprising:
    a plurality of interconnected beads forming a flexible arm, each bead rotatable with respect to adjacent beads, the plurality of interconnected beads forming an axially extending bore, and having a first end bead at a first end of said arm and a second end bead at a second end of said arm;
    a shower pipe connector nut defining an internal bore extending therethrough, and having a first end for fluid connection to the shower pipe, and a second end, said second end threadedly connected to said first end bead for fluid connection to said connection bead;
    a shower head defining a connection structure having an internal bore extending therethrough for fluid connection to said second end bead at said second end of said arm; and
    a locking mechanism between said first end bead and said connector nut enabled by the threaded connection therebetween to resist the disconnection of said first end bead and said connection nut.

2. A flexible shower arm assembly as defined in claim 1, wherein said locking mechanism comprises:
    a protrusion extending radially outwardly from said first end bead;
    a ramp extending radially inwardly from said connector nut; and
    wherein when said first end bead rotatably engages said connector nut, said protrusion engages said ramp to lock said end bead from disengaging from said connector nut.

3. A flexible shower arm assembly as defined in claim 2, wherein:
    a plurality of ramps extend radially inwardly from said connector nut;
    a plurality of protrusions extend radially outwardly from said first end bead; and
    wherein when said first end bead rotatably engages said connector nut, each of said plurality of protrusions engage one of said pluralities of ramps to lock said end bead from disengaging from said connector nut.

4. A flexible shower arm assembly for connection to a shower pipe at one end, the assembly comprising:

a plurality of interconnected beads forming a flexible arm, each bead rotatable with respect to adjacent beads, the plurality of interconnected beads forming an axially extending bore, and having a first end bead at a first end of said arm and a second end bead at a second end of said arm, said second end bead defining a male end;

a shower pipe connector nut defining an internal bore extending therethrough, and having a first end for fluid connection to the shower pipe, and a second end for fluid connection to said first end bead; and a shower head defining a connection structure having an internal bore extending therethrough for fluid connection to said second end bead at said second end of said arm, said connection structure comprising:
a retainer having longitudinally extending fingers;
a collar for receiving said second end bead and said retainer;
a connector for causing the engagement of said second end bead and said retainer in said collar;

said male end positioned in said retainer, said retainer positioned in said collar, and said connector positioned in said collar;

said connector engaging said retainer to cause said fingers to contact said collar and to wrap around said male end and secure said male end in said shower head.

5. A flexible shower arm assembly as defined in claim 4, wherein said retainer forms a watertight seal with said male end.

6. A flexible shower arm assembly as defined in claim 4, wherein said retainer defines an internal wall, which in turn defines a continuously-extending seal rim for engaging and forming a water-tight seal with said male end.

7. A flexible shower arm assembly as defined in claim 4, wherein said retainer forms a continuous external annular protrusion for engagement with said connector to form a water tight seal therewith.

8. A flexible shower arm assembly as defined in claim 6, wherein said retainer also forms a continuous external annular protrusion for engagement with said connector to form a water tight seal therewith.

9. A flexible shower arm assembly as defined in claim 6, wherein said seal rim is positioned at the base of said longitudinally extending fingers.

10. A flexible shower arm assembly as defined in claim 4, wherein said collar defines a conical rim having an inner engagement surface; and
wherein said connector causes said fingers to engage said engagement surface of said conical rim and move inwardly to wrap around said male end and secure said male end in said collar.

11. A flexible shower arm assembly as defined in claim 4, wherein said connector is moved axially within said collar to cause said retainer to engage said collar.

* * * * *